(12) United States Patent
Masterson et al.

(10) Patent No.: US 7,464,780 B2
(45) Date of Patent: Dec. 16, 2008

(54) SYSTEM AND METHOD FOR RECOVERING REGENERATIVE POWER IN A VEHICLE, AND VEHICLE USING THE SAME

(75) Inventors: Brandon Masterson, Dexter, MI (US); Walter Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 11/458,775

(22) Filed: Jul. 20, 2006

(65) Prior Publication Data

US 2008/0017428 A1   Jan. 24, 2008

(51) Int. Cl.
*B60K 6/00* (2007.10)
(52) U.S. Cl. ..................... 180/65.3; 180/65.2
(58) Field of Classification Search ........ 180/65.1–65.4
See application file for complete search history.

(56) References Cited

U.S. PATENT DOCUMENTS

| | | | |
|---|---|---|---|
| 5,492,192 A * | 2/1996 | Brooks et al. ............... | 180/165 |
| 5,791,427 A * | 8/1998 | Yamaguchi ................. | 180/65.3 |
| 5,879,062 A | 3/1999 | Koga et al. | |
| 5,997,107 A | 12/1999 | Koga et al. | |
| 6,543,565 B1 | 4/2003 | Phillips et al. | |
| 6,549,840 B1 | 4/2003 | Mikami et al. | |
| 6,622,804 B2 * | 9/2003 | Schmitz et al. ............ | 180/65.2 |
| 6,702,404 B2 | 3/2004 | Anwar et al. | |
| 6,885,920 B2 * | 4/2005 | Yakes et al. ................. | 701/22 |
| 2005/0119805 A1 | 6/2005 | Bischoff | |
| 2005/0143878 A1 | 6/2005 | Park et al. | |
| 2006/0004507 A1 | 1/2006 | Teslak et al. | |

* cited by examiner

*Primary Examiner*—Christopher P Ellis
*Assistant Examiner*—Bridget Avery
(74) *Attorney, Agent, or Firm*—David B. Kelley; Brooks Kushman P.C.

(57) ABSTRACT

A system, method and vehicle using the same for increasing regenerative power recovered during vehicle deceleration. The system includes first and second sets of vehicle wheels, a controller, an electric machine, a regenerative power source, and a driveline. The electric machine performs as a motor/generator in a first/second mode of operation, respectively. The regenerative power source is electrically coupled to the electric machine and is configured to supply/receive power to/from the electric machine when the electric machine is in the first/second mode of operation, respectively. The driveline is coupled to the electric machine and the first set of vehicle wheels for transferring torque. The driveline includes a controllable coupling apparatus in electronic communication with the controller for selectively coupling, during vehicle deceleration, the electric machine to the second set of vehicle wheels.

20 Claims, 3 Drawing Sheets

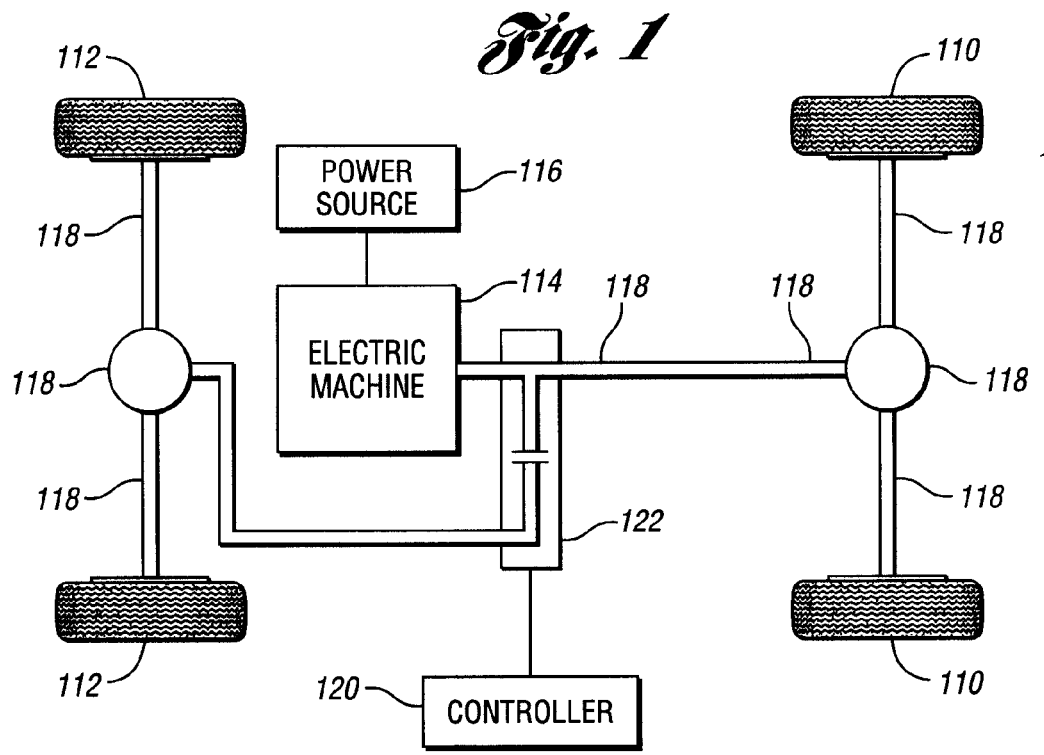
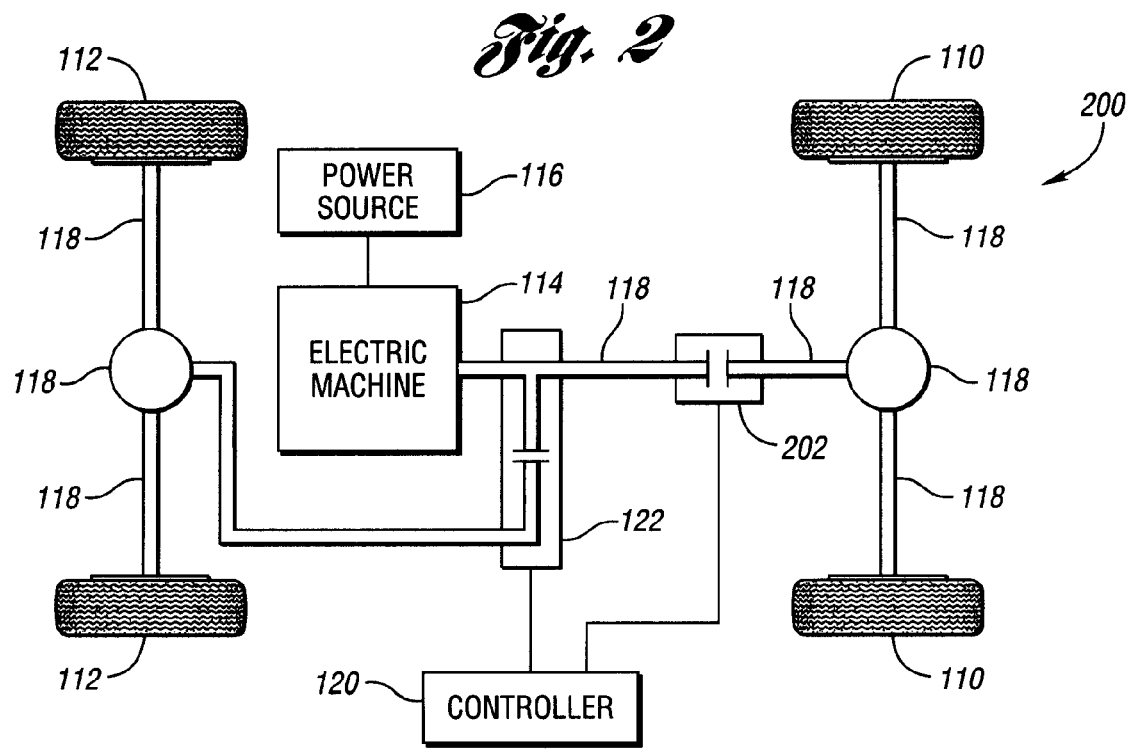

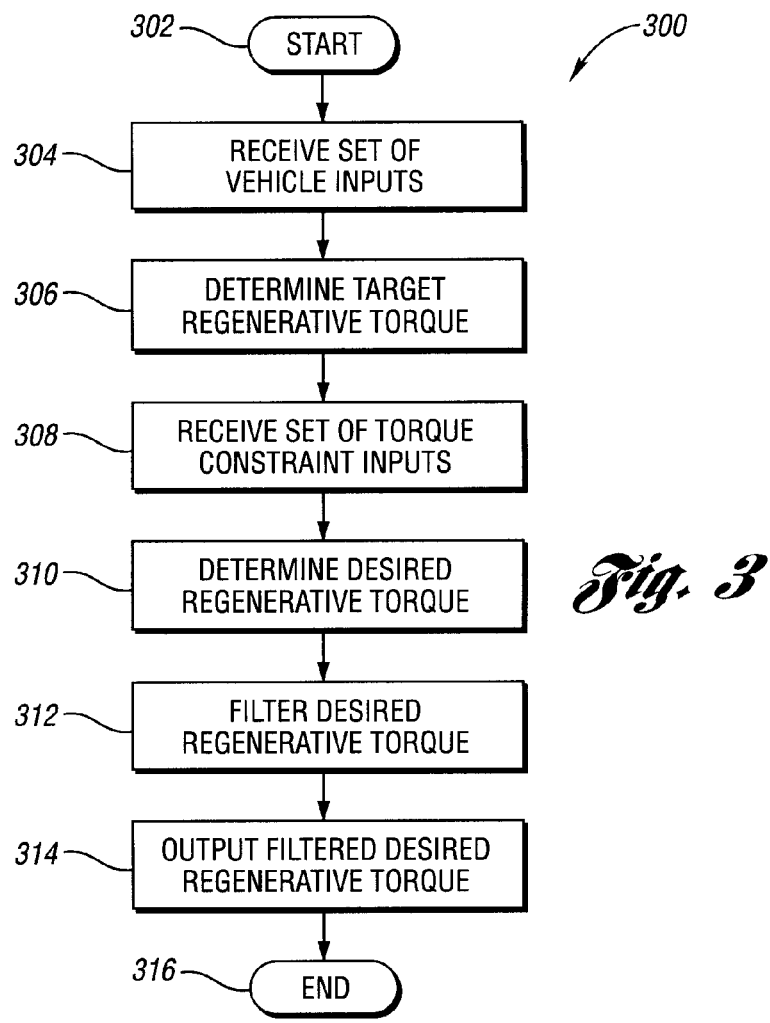
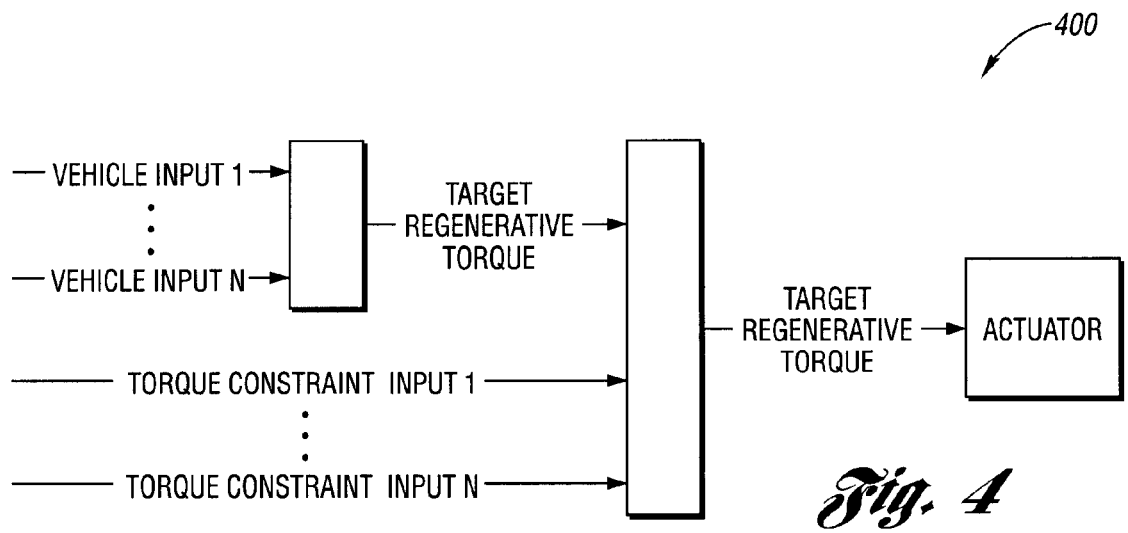

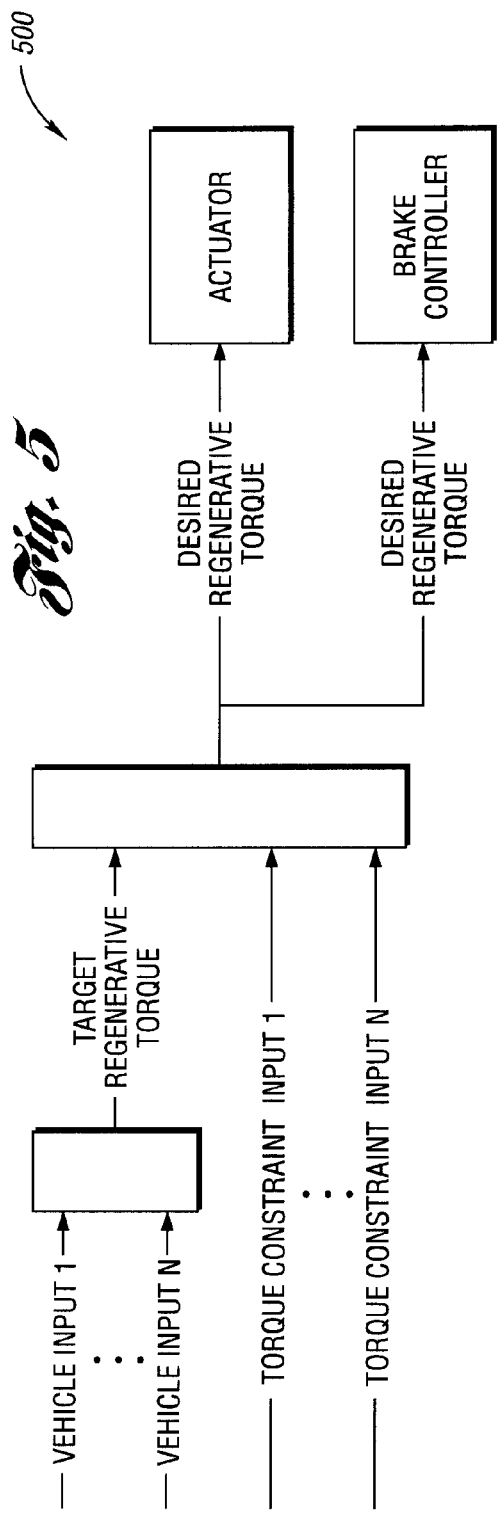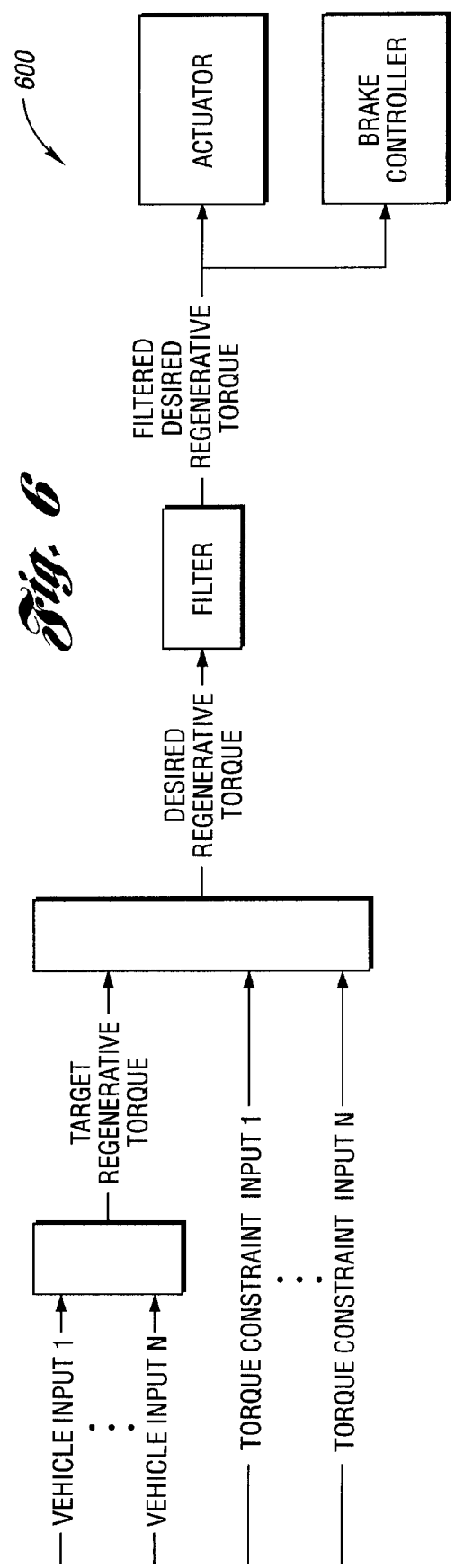

SYSTEM AND METHOD FOR RECOVERING REGENERATIVE POWER IN A VEHICLE, AND VEHICLE USING THE SAME

BACKGROUND OF THE INVENTION

1. Field of the Invention

The present invention relates generally to a system and method for recovering regenerative power in a vehicle, and more particularly to a system and method for recovering regenerative power in a vehicle having an electric machine.

2. Background Art

Pure electric and hybrid electric vehicles (i.e., electric vehicles) generally include an electric machine for providing, at least in part, tractive force to the vehicle drive wheels. In addition, electric vehicles generally include a power source, such as a battery, an ultra capacitor and/or the like, to supply power to the electric machine.

In general, the energy (e.g., fuel) economy of electric vehicles may be improved by recovering (i.e., capturing) the vehicle's kinetic energy during vehicle deceleration (i.e., brake regeneration). More particularly, during deceleration, braking torque (i.e., negative torque) may be provided to the driven wheels by using the electric machine as a generator. Accordingly, the electric machine may generate electric charge (i.e., regenerative power) during vehicle deceleration which may then be stored at the power source.

In rear wheel drive (i.e., RWD) electric vehicles, tractive force may be applied to the rear wheels by coupling the electric machine to the rear wheels. Accordingly, during brake regeneration, the electric machine is only capable of recovering kinetic energy from (i.e., providing braking torque to) the rear wheels. Because a vehicle generally becomes unstable when braking torque is applied solely to the rear wheels, friction brakes are often used to provide additional braking torque to the front vehicle wheels. More particularly, stability may be generally maintained when 30% or less of the total braking torque (e.g., the sum of the braking torques generated by the electric machine and the friction brakes) is applied to the rear wheels and 70% or more of the total braking torque is applied to the front wheels. This 30/70 split dictates that, at most, 30% of the total available regenerative power, corresponding to 30% of the total braking torque, may be recovered during deceleration of a RWD vehicle.

Similarly, a four wheel drive (i.e., 4WD) electric vehicle generally includes an electric machine coupled to the rear vehicle wheels and selectively coupled, for example via a transfer case, to the front vehicle wheels such that the tractive force generated by the electric machine may be applied to all four wheels of the vehicle. However, conventional 4WD electric vehicles generally decouple the front vehicle wheels from the electric machine during vehicle deceleration. Accordingly, conventional 4WD electric vehicles generally behave as RWD electric vehicles during deceleration. It follows then, that conventional 4WD electric vehicles are generally capable of recovering, at most, 30% of the total available regenerative power.

It may be desirable, therefore, to have a system and method for increasing the amount of regenerative power (i.e., electric power generated from the braking torque) recovered during deceleration of a vehicle.

SUMMARY OF THE INVENTION

In general, a system and method are provided for increasing the regenerative power recovered during deceleration of a vehicle.

In accordance with one embodiment of the present invention, a system is provided for recovering regenerative power in a vehicle. The system includes first and second sets of vehicle wheels, a controller, an electric machine, a regenerative power source, and a driveline. The electric machine performs as a motor in a first mode of operation and performs as a generator in a second mode of operation. The regenerative power source is electrically coupled to the electric machine and is configured to supply power to the electric machine when the electric machine is in the first mode of operation. Similarly, the regenerative power source is configured to receive power from the electric machine when the electric machine is in the second mode of operation. The driveline is coupled to the electric machine and the first set of vehicle wheels for transferring torque between the electric machine and the first set of vehicle wheels. The driveline includes a controllable coupling apparatus in electronic communication with the controller for selectively coupling, during vehicle deceleration, the electric machine to the second set of vehicle wheels. The controllable coupling apparatus selectively couples the electric machine to the second set of vehicle wheels in response to a signal from the controller.

In accordance with another embodiment of the present invention, a method is provided for recovering regenerative power in a vehicle when the vehicle is operating in a regenerative mode. The vehicle generally comprises a first set of vehicle wheels, a second set of vehicle wheels, one or more controllers, an electric machine coupled to the first set of vehicle wheels via a driveline, and a regenerative power source electronically coupled to the electric machine. The method comprises the steps of receiving a set of vehicle inputs, receiving a set of torque constraint inputs, and determining, based at least in part on one or more members of the set of vehicle inputs, a target regenerative torque corresponding to the second set of vehicle wheels when the vehicle is operating in the regenerative mode. The method further includes the steps of limiting, based at least in part on one or more members of the set of torque constraint inputs, the target regenerative torque to generate a desired regenerative torque corresponding to the second set of vehicle wheels, and outputting a signal corresponding to the desired regenerative torque to an actuator of a controllable coupling apparatus. The actuator of the controllable coupling apparatus controllably couples, in response to the outputted signal, the second set of vehicle wheels to the electric machine such that regenerative power from the second set of vehicle wheels is recovered by the regenerative power source.

In accordance with yet another embodiment of the present invention, a rear wheel drive hybrid electric vehicle is provided. The vehicle includes a rear set of vehicle wheels, a front set of vehicle wheels, one or more controllers, an electric machine, a regenerative power source, and a driveline. The electric machine performs as a motor in a first mode of operation and performs as a generator in a second mode of operation. The regenerative power source is electrically coupled to the electric machine. The regenerative power source is configured to supply power to the electric machine when the electric machine is in the first mode of operation and to receive power from the electric machine when the electric machine is in the second mode of operation. The driveline is coupled to the electric machine and the rear set of vehicle wheels for transferring torque between the electric machine and the rear set of vehicle wheels. The driveline includes a transfer case in electronic communication with the one or more controllers for selectively coupling, during vehicle deceleration, the electric machine to the front set of vehicle wheels. The transfer case selectively couples the electric machine to the front set of vehicle wheels in response to a signal from the one or more controllers.

BRIEF DESCRIPTION OF THE DRAWINGS

FIG. 1 is a schematic diagram of a system for recovering regenerative power in a vehicle according to an embodiment of the present invention;

FIG. 2 is a schematic diagram of a system for recovering regenerative power in a vehicle according to another embodiment of the present invention;

FIG. 3 is a flow diagram of a method for recovering regenerative power in a vehicle according to an embodiment of the present invention;

FIG. 4 is a control diagram according to an embodiment of the present invention;

FIG. 5 is a control diagram according to another embodiment of the present invention; and FIG. 6 is a control diagram according to yet another embodiment of the present invention.

DETAILED DESCRIPTION

Referring to FIG. 1, a schematic diagram is provided of a system 100 for recovering regenerative power in an electric (e.g., pure electric, hybrid electric, etc.) vehicle according to an embodiment of the present invention. The system 100 generally comprises a first 110 and second 112 set of vehicle wheels, an electric machine 114, a regenerative power source 116, and a driveline 118. The system 100 may also include a controller 120, such as a Vehicle System Controller (i.e., VSC), for controlling the functionality of one or more components and/or sub-components of the system 100. In general, the controller 120 may be a computer or other logical device which executes programs and/or which performs other logical exercises. It is contemplated that control of the functionality of the one or more components/sub-components of the system 100 may be incorporated into a single controller, such as is shown in FIG. 1. Alternatively, control of the functionality may be distributed among a plurality of controllers. In a distributed control system, controller inputs and outputs may be received and passed between controllers via a network (e.g., a controller area network, etc.), dedicated communication wires, and/or the like.

The electric machine 114 is generally coupled to the first set of vehicle wheels 110 via the driveline 118 and may be configured to performs as a motor/generator in a first/second mode of operation, respectively. When operating as a motor, the electric machine 114 generally provides mechanical power (i.e., tractive force) to the first 110 and/or second 112 set of vehicle wheels to propel an associated vehicle. Similarly, when operating as a generator, the electric machine 114 may generate an electric charge (i.e., regenerative power) from negative torque (i.e., braking torque) received from the first 110 and/or second 112 set of wheels.

The regenerative power source 116 may be any appropriate apparatus for storing an electric charge (i.e., power), such as a battery, an ultra capacitor and/or the like. In general, the regenerative power source 116 is in electrical communication (i.e., electrically coupled) with the electric machine 114 for supplying power to the electric machine 114 when the electric machine 114 is operating as a motor. Similarly, the regenerative power source 116 may be configured to receive power (i.e., store power) generated by the electric machine 114 when the electric machine 114 is operating as a generator.

In general, the driveline 118 includes one or more components, such as one or more shafts, one or more differentials, one or more gears and/or the like, for transferring torque between (e.g., unidirectionally and/or bidirectionally) the electric machine 114 and the first 110 and/or second 112 set of vehicle wheels. In at least one embodiment, the driveline 118 includes a controllable coupling apparatus 122 (e.g., an electronically actuated clutch, a transfer case and/or the like)in electronic communication with the controller 120. The controllable coupling apparatus 122 may selectively couple the electric machine 114 to the second set of vehicle wheels 112 in response to a signal from the controller 120. In at least one embodiment, the controllable coupling apparatus 122 may be configured to selectively couple (e.g., during vehicle deceleration)the electric machine 114 and the second set of wheels 112 along the spectrum between fully coupled and fully decoupled (e.g., 0%-100% of coupling)in response to the signal from the controller 120.

As will be more fully described in connection with the method 300, described in detail in connection with FIG. 3, the system 100 generally provides for an increase in the amount of regenerative power, such as electric power generated from braking torque, recovered during deceleration (i.e., braking) of a corresponding vehicle.

Referring to FIG. 2, a schematic diagram of a system 200 for recovering regenerative power in an electric vehicle according to another embodiment of the present invention is shown. The system 200 may be implemented similarly to the system 100 with the exception that the driveline 118 of the system 200 may also include a controllable decoupling apparatus 202 (e.g., an electronically actuated clutch, etc.) for selectively decoupling the first set of vehicle wheels 110 from the electric machine 114 in response to a signal from the controller 120. In at least one embodiment, the controllable decoupling apparatus 202 may be configured to selectively decouple the electric machine 114 and the first set of wheels 110 along the spectrum between fully decoupled and fully coupled (e.g., 0%-100% of decoupling) in response to the signal from the controller 120.

It may be noted that element 202 has been denoted as a decoupling apparatus for the reason that the wheels 110 are generally driven during normal operation (i.e., non-regenerative mode, non-braking operation, etc.) of a corresponding vehicle. Similarly, element 122 has been denoted as a coupling apparatus to reflect the notion that the wheels 112 are generally not driven during normal, non-four wheel drive (i.e., 4WD) operation, of the corresponding vehicle. Accordingly, the first set of vehicle wheels 110 may generally correspond to a driven set of vehicle wheels while the second set of vehicle wheels 112 may generally correspond to a non-driven set of vehicle wheels. For example, in an embodiment wherein the corresponding vehicle is a rear wheel drive (i.e., RWD) vehicle, the first set of vehicle wheels 110 may correspond to the rear vehicle wheels and the second set of vehicle wheels 112 may correspond to the front vehicle wheels.

As will be more fully described in connection with the method 300, described in detail in connection with FIG. 3, the system 200 generally provides for an increase in the amount of regenerative power (i.e., electric power generated from braking torque) recovered during deceleration (i.e., braking) of a corresponding vehicle.

Referring to FIG. 3, a flow diagram is provided of a method 300 for recovering regenerative power in a vehicle, such as an electric vehicle, according to an embodiment of the present invention. More particularly, the method 300 determines an amount of braking torque (i.e., regenerative torque, negative torque, etc.) to be applied to a second set of wheels (e.g., 112), such as a non-driven set, via a controllable coupling apparatus (e.g., 122) during vehicle deceleration (i.e., braking). By determining the amount of regenerative torque to be applied to the second set of wheels, the method 300 may, when advantageously implemented in connection with the systems 100 and/or 200 described previously in connection with FIGS. 1 and 2, respectively, and/or any appropriate system, provide for recovery of previously unrecoverable power from the second set of wheels during vehicle deceleration. In general, the method 300 may provide such power recovery while maintaining vehicle stability. The method 300 is generally performed by one or more logical devices, such as the controller 120. The method 300 generally includes a plurality of blocks or steps that may be performed serially. As will be appreciated by one of ordinary skill in the art, the order of the blocks/steps shown in FIG. 3 is exemplary and the order of one or more block/step may be modified within the spirit and scope of the present invention. Additionally, the blocks/steps of the method 300 may be performed in at least one non-serial (or non-sequential) order, and one or more blocks/steps may be omitted to meet the design criteria of a particular application. Similarly, two or more of the blocks/steps of the method 300 may be performed in parallel. Step 302 generally represents an entry point into the method 300. In at least one embodiment, the method 300 may be triggered (i.e, step 302 entered) by the vehicle entering a regenerative (i.e., braking, deceleration, etc.) mode.

At step 304 a set of vehicle inputs, representing one or more characteristics of the vehicle operating state, may be received. In at least one embodiment, the set of vehicle inputs may include one or more signals corresponding to brake pressure, brake pedal position, total required/total available regenerative torque, mode of vehicle operation (e.g., regeneration mode, normal operating mode, etc.), and/or engine status (e.g., on, off, etc.). However, the set of vehicle inputs may include any appropriate signal corresponding to any appropriate vehicle/operational characteristic to meet the design criteria of a particular application. Furthermore, in at least one embodiment, one or more members of the set of vehicle inputs may provide feed-forward control data indicative of changes in vehicle driver commands. For example, a reduction in brake pressure and/or a change in brake position may indicate an impending acceleration of the vehicle.

In an embodiment having a controllable decoupling apparatus, such as element 202 of system 200, the set of vehicle inputs may also include one or more signals corresponding to a position (i.e., present state) of the controllable decoupling apparatus and/or the regenerative torque from a first set of vehicle wheels (e.g., 110).

At step 306, a target regenerative torque may be determined based at least in part on one or more members of the set of vehicle inputs. In general, the target regenerative torque corresponds to the second set (i.e., generally non-driven set) of vehicle wheels (e.g., 112) when the vehicle is operating in the regenerative mode (i.e., braking mode, deceleration mode, etc.).

At step 308, a set of torque constraint inputs may be received. In at least one embodiment, the set of torque constraint inputs may comprise one or more signals corresponding to steering angle, wheel slip, position of gas pedal, driver torque demand, anti-lock brake system mode of operation (e.g., on/off), and/or roll stability mode of operation (e.g., on/off). However, the set of torque constraints may include any appropriate signal corresponding to any appropriate vehicle/operational characteristic to meet the design criteria of a particular application. In general, the torque constraint inputs correspond to factors which may warrant modification of the target regenerative torque. For example, wheel slip may indicate a road surface having a low coefficient of friction. Similarly, steering angle may indicate that the corresponding vehicle is engaged in a turn.

At step 310, the target regenerative torque may be modified (e.g., limited), based at least in part on one or more members of the set of torque constraint inputs, to generate a desired regenerative torque corresponding to the second set of vehicle wheels.

At step 312, the desired regenerative torque may be filtered to generate a filtered desired regenerative torque. In general, the filter step 312 may be optionally implemented to prevent sudden changes in wheel torque.

At step 314, a signal corresponding to the filtered desired regenerative torque, or desired regenerative torque in an embodiment wherein no filtering occurs (i.e., step 312 omitted), may be outputted to an actuator of a controllable coupling apparatus (e.g., 122) and/or other appropriate device (e.g., brake controller, friction brake controller, etc.). In general, the desired regenerative torque may be implemented in connection with the appropriate device, such as the controllable coupling apparatus 122, to controllably couple the second set of vehicle wheels (e.g., 112) to the electric machine (e.g., 114) such that regenerative power from the second set of vehicle wheels is recovered by a regenerative power source (e.g., 116) during vehicle deceleration (i.e., braking).

Step 316 generally represents an exit point out of the method 300.

Accordingly, the present invention generally provides a system and/or method for increasing the regenerative power (i.e., electric power generated from braking torque) recovered during deceleration of a vehicle.

For example, in a first exemplary embodiment, the system 100 may be implemented in connection with the method 300 for use in a RWD vehicle. Such an embodiment may require the 30 (rear)/70 (front) braking torque split, discussed previously, in order to maintain stability of the corresponding vehicle. However, because the implementation of the controllable coupling apparatus 122 provides for mechanical coupling of the electric machine 114 to the front wheels (i.e., 112), an amount of front wheel braking torque substantially equal to the amount of rear wheel braking torque may be recovered during vehicle deceleration. Since 30% of the total available braking torque is the maximum amount of applicable rear wheel braking torque, a total of about 60% of the total available braking torque (i.e., 30% from the front wheels and 30% from the rear wheels) may be recovered as regenerative power in such an exemplary embodiment. The remaining 40% of the total braking torque may be implemented via an alternative braking mechanism acting on the front wheels, such as friction brakes.

In a second exemplary embodiment, the system 200 may be implemented in connection with the method 300 for use in a RWD vehicle. The implementation of the controllable decoupling apparatus 202 generally provides for the partial to total decoupling of the electric machine 114 from the rear vehicle wheels 110. If the electric machine 114 is completely decoupled from the rear wheels 110 during vehicle deceleration, the previously discussed braking torque split (e.g., 30/70) is no longer a limiting factor and 100% of the total braking torque may be applied to the front wheels (i.e., second wheel set) 112 via the controllable coupling apparatus 122. Accordingly, 100% of the total available braking torque may be recovered as regenerative power.

While a 30 (rear)/70 (front) braking torque split has been used to illustrate one or more advantages of the present invention, it should be noted that various other braking torque split ratios may be applicable to a particular vehicle and/or particular vehicle operating conditions. Nonetheless, the present invention generally provides for an increase in the amount of regenerative power recovered during deceleration (i.e., braking) of a corresponding vehicle when compared to a vehicle not incorporating the present invention. In general, the increase in regenerative power recovery may be attributed to a general increase in electric machine generated braking torque and a general decrease in other braking mechanisms, such as friction brakes.

Referring to FIG. 4, a control diagram 400 is provided for a system/method, according to at least one embodiment of the present invention, wherein the filtering step 312 of method 300 has been omitted. In such an embodiment, the desired regenerative torque may be outputted to an appropriate device, such as an actuator of a controllable coupling apparatus (e.g., 122).

Referring to FIG. 5, a control diagram 500 is provided for a system/method, according to at least one embodiment of the present invention, wherein the filtering step 312 of method 300 has been omitted and the desired regenerative torque is outputted to a plurality of appropriate devises, such as an actuator of a controllable coupling apparatus (e.g., 122) and a brake controller. In one embodiment, the brake controller may control the application of one or more supplemental friction brakes.

Referring to FIG. 6, a control diagram 600 is provided for a system/method, according to at least one embodiment of the present invention, including the filtering step 312 of method 300. Furthermore, the filtered desired regenerative torque is outputted to a plurality of appropriate devises, such as an actuator of a controllable coupling apparatus (e.g., 122) and a brake controller.

While the best mode for carrying out the invention has been described in detail, those familiar with the art to which this invention relates will recognize various alternative designs and embodiments for practicing the invention as defined by the following claims.

What is claimed:

1. A system for recovering regenerative power in a vehicle, the system comprising:
   a first set of vehicle wheels;
   a second set of vehicle wheels;
   one or more controllers;
   an electric machine that performs as a motor in a first mode of operation and performs as a generator in a second mode of operation;
   a regenerative power source electrically coupled to the electric machine, the regenerative power source configured to supply power to the electric machine when the electric machine is in the first mode of operation and to receive power from the electric machine when the electric machine is in the second mode of operation; and
   a driveline coupled to the electric machine and the first set of vehicle wheels for transferring torque between the electric machine and the first set of vehicle wheels, the driveline including a controllable coupling apparatus in electronic communication with the one or more controllers for selectively coupling, during vehicle deceleration, the electric machine to the second set of vehicle wheels in response to a signal from the one or more controllers.

2. The system of claim 1 wherein the one or more controllers are configured to:
   receive a set of vehicle inputs;
   receive a set of torque constraint inputs;
   determine, based at least in part on one or more members of the set of vehicle inputs, a target regenerative torque corresponding to the second set of vehicle wheels when the vehicle is operating in a regenerative mode;
   limit, based at least in part on one or more members of the set of torque constraint inputs, the target regenerative torque to generate a desired regenerative torque corresponding to the second set of vehicle wheels; and
   output a signal corresponding to the desired regenerative torque to an actuator of the controllable coupling apparatus to controllably couple the second set of vehicle wheels to the electric machine such that regenerative power from the second set of vehicle wheels is recovered by the regenerative power source.

3. The system of claim 1 wherein the driveline further includes a controllable decoupling apparatus for selectively decoupling the first set of vehicle wheels from the electric machine in response to a second signal from the one or more controllers.

4. The system of claim 1 wherein the system is implemented in connection with a hybrid electric vehicle.

5. The system of claim 1 wherein the system is implemented in connection with a pure electric vehicle.

6. The system of claim 1 wherein the controllable coupling apparatus includes an electronically actuated clutch.

7. The system of claim 1 wherein the vehicle is a rear wheel drive vehicle and the first set of vehicle wheels are rear vehicle wheels.

8. The system of claim 1 wherein the first/second set of vehicle wheels are driven/non-driven, respectively, during normal operation of the vehicle.

9. A method for recovering regenerative power in a vehicle when the vehicle is operating in a regenerative mode, the vehicle comprising a first set of vehicle wheels, a second set of vehicle wheels, one or more controllers, an electric machine coupled to the first set of vehicle wheels via a driveline, and a regenerative power source electronically coupled to the electric machine, the method comprising:
   receiving a set of vehicle inputs;
   receiving a set of torque constraint inputs;
   determining, based at least in part on one or more members of the set of vehicle inputs, a target regenerative torque corresponding to the second set of vehicle wheels when the vehicle is operating in the regenerative mode;
   limiting, based at least in part on one or more members of the set of torque constraint inputs, the target regenerative torque to generate a desired regenerative torque corresponding to the second set of vehicle wheels; and
   outputting a signal corresponding to the desired regenerative torque to an actuator of a controllable coupling apparatus to controllably couple the second set of vehicle wheels to the electric machine such that regenerative power from the second set of vehicle wheels is recovered by the regenerative power source.

10. The method of claim 9 wherein the set of vehicle inputs comprises one or more signals corresponding to at least one of brake pressure, brake pedal position, total required regenerative torque, mode of vehicle operation, and engine status.

11. The method of claim 9 wherein the set of torque constraint inputs comprises one or more signals corresponding to at least one of steering angle, wheel slip, position of gas pedal, driver torque demand, anti-lock brake system mode of operation, and roll stability mode of operation.

12. The method of claim 9 further comprising filtering the desired regenerative torque prior to outputting the signal corresponding to the desired regenerative torque to the actuator of the controllable coupling apparatus.

13. The method of claim 9 further comprising outputting the signal corresponding to the desired regenerative torque to a friction brake controller.

14. The method of claim 9 wherein the driveline comprises a controllable decoupling apparatus for selectively decoupling the first set of vehicle wheels from the electric machine in response to a control signal.

15. The method of claim 9 wherein the first/second set of vehicle wheels are driven/non-driven, respectively, during normal operation of the vehicle.

16. The method of claim 14 wherein the set of vehicle inputs includes a signal corresponding to at least one of a position of the controllable decoupling apparatus and regenerative torque from the first set of vehicle wheels.

17. The method of claim 14 further comprising completely decoupling, via the controllable decoupling apparatus, the first set of vehicle wheels from the electric machine during vehicle deceleration.

18. The method of claim 17 wherein the vehicle is a rear wheel drive vehicle and the first set of vehicle wheels are rear vehicle wheels.

19. A rear wheel drive hybrid electric vehicle comprising:
   a rear set of vehicle wheels;
   a front set of vehicle wheels;
   one or more controllers;
   an electric machine that performs as a motor in a first mode of operation and performs as a generator in a second mode of operation;
   a regenerative power source electrically coupled to the electric machine, the regenerative power source configured to supply power to the electric machine when the electric machine is in the first mode of operation and to receive power from the electric machine when the electric machine is in the second mode of operation; and
   a driveline coupled to the electric machine and the rear set of vehicle wheels for transferring torque between the electric machine and the rear set of vehicle wheels, the driveline including a transfer case in electronic communication with the one or more controllers for selectively coupling, during vehicle deceleration, the electric machine to the front set of vehicle wheels in response to a signal from the one or more controllers.

20. The system of claim 19 wherein the one or more controllers are configured to:
   receive a set of vehicle inputs;
   receive a set of torque constraint inputs;
   determine, based at least in part on one or more members of the set of vehicle inputs, a target regenerative torque corresponding to the front set of vehicle wheels when the vehicle is operating in a regenerative mode;
   limit, based at least in part on one or more members of the set of torque constraint inputs, the target regenerative torque to generate a desired regenerative torque corresponding to the front set of vehicle wheels; and
   output a signal corresponding to the desired regenerative torque to the transfer case to controllably couple the front set of vehicle wheels to the electric machine such that regenerative power from the front set of vehicle wheels is recovered by the regenerative power source.

* * * * *